Figure 2:
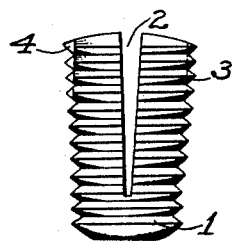

June 10, 1930.  R. T. HOSKING  1,762,394
BOLT LOCK
Filed Sept. 20, 1928

INVENTOR
RICHARD T. HOSKING
BY George R. Willcox
ATTORNEY

Patented June 10, 1930

1,762,394

UNITED STATES PATENT OFFICE

RICHARD T. HOSKING, OF WILMETTE, ILLINOIS, ASSIGNOR, BY MESNE ASSIGNMENTS, TO SHAKEPROOF LOCK WASHER COMPANY, INCORPORATED, OF CHICAGO, ILLINOIS, A CORPORATION OF DELAWARE

BOLT LOCK

Application filed September 20, 1928. Serial No. 307,164.

This invention is a threaded screw or bolt adapted to provide a certain amount of frictional resistance when the screw is turned in the opposite direction from that in which it was turned when tightening; the purpose of providing such resistance being to enable the screw or bolt to resist unscrewing under all ordinary conditions of use, yet not producing any locking or biting effect such as would prevent unscrewing except by cutting into and more or less mutilating the threads in the work.

In my co-pending application, Serial No. 273,805, there is described and claimed a screw or bolt structure having certain characteristics common to the present invention, but differing therefrom in certain essential respects. Both the present invention and that of the co-pending application employ a screw or bolt whose body is formed with a longitudinal slit that divides the bolt for a part of its length into two externally threaded members, both of which are of segment-shaped cross section, or substantially so. Both of these members can be employed as spring tongues to produce the desired frictional resistance, or only one, as circumstances warrant.

In the device of the said co-pending case the two segment-shaped members of the split bolt are offset with respect to each other in a direction parallel to the slit, the two legs thus being brought into eccentric relation and two of the resulting edges are thus projected outside the cylindrical body of the bolt and become biting edges whose function is to cut into the threaded wall of the work or nut when it is attempted to unscrew the bolt, thereby producing a positive locking effect by biting.

In the present invention it is not desired to cause the bolt threads to bite into the threads of the work with great force; on the contrary the bolt threads produce only a moderate amount of frictional pressure against the work. For the purpose of the present invention the bifurcated members of the bolt are deformed by being sprung outwardly, that is, away from each other, at some point along the length of the slit. They are bent out in a direction perpendicular to the plane of the slit, and are thus made to present a cross-sectional shape somewhat elliptical, and having outwardly bowed threaded surfaces that bear only frictionally against the threaded wall of the hole in the work.

In the former device above mentioned the bifurcated members were offset from each other in opposite directions, and in or parallel with the plane of the slit, instead of at right angles thereto.

With the foregoing and certain other objects in view, which will appear later in the specification, my invention comprises the devices described and claimed and the equivalents thereof.

Figure 1:
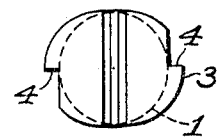

Fig. 1 is a plan view.
Fig. 2 is a view in elevation.

As is shown in the drawings, the invention consists in the bolt or screw 1 formed with a longitudinal slit 2 that extends through a part of the length of the bolt, bifurcating it and producing two resilient members 3, 3. These members are bent, at some place in their length, outwardly away from and in a direction at right angles to the plane of the slit. At such place they are spaced farther apart than the normal width of the slit.

Thus a portion of the threaded bolt or screw, being that portion which is to be received in the threaded hole in the work, is bowed outwardly for a part of its length so as to present two complemental resilient members. These complemental members are necessarily sprung toward each other when the screw is threaded into the work, producing therewith frictional engagement sufficient to hold the screw against the threads in the work and to prevent the screw from loosening under all ordinary conditions of use. The frictional resistance does not produce any positive locking effect, consequently the screw can be used repeatedly in the same threaded hole without injury.

The invention may be embodied in bolts or screws of various forms.

The drawing depicts a screw in which the slit 2 extends from the top downward, the resultant resilient members 3 being spread apart to form legs which are farthest apart at the upper end of the screw.

The holding effect is increased to some extent by providing oppositely disposed notches 4 in the upper part of the bolt. The notches extend inward only to the bottom of the thread and run longitudinally as shown. They somewhat augment the frictional grip between the screw and the work, but since they do not project beyond the thread circle in the plane of the slit 2 they do not constitute positive locking or biting teeth in the sense in which those teeth are employed in the structure of my co-pending application above referred to. The slit 2 may be utilized to receive a screw driver or other tool.

Obviously, the screw can be used many times, since there is no cutting or mutilating action produced by the outwardly sprung resilient members 3.

Having thus described my invention, what I claim and desire to secure by Letters Patent is:

A threaded screw formed with a longitudinally extending slit that divides a portion of the length of the screw body into two complemental resilient members, said members bent away from each other in a direction perpendicular to the plane of the slit to provide outwardly bulging threaded areas having oppositely disposed notches extending inwardly to the bottom of the thread and extending lengthwise the bolt, said threaded and longitudinally notched areas adapted to be received in the threaded hole in a piece of work and to normally engage the walls thereof by yielding frictional contact therewith.

In testimony whereof, I affix my signature.

RICHARD T. HOSKING.